Sept. 27, 1949.    E. A. HAAGENSEN    2,482,765
SUGAR SOLUTION ION EXCHANGE
Filed July 10, 1946    3 Sheets-Sheet 1

INVENTOR:
EDWARD A. HAAGENSEN
BY
Autumn Middleton
ATT'Y.

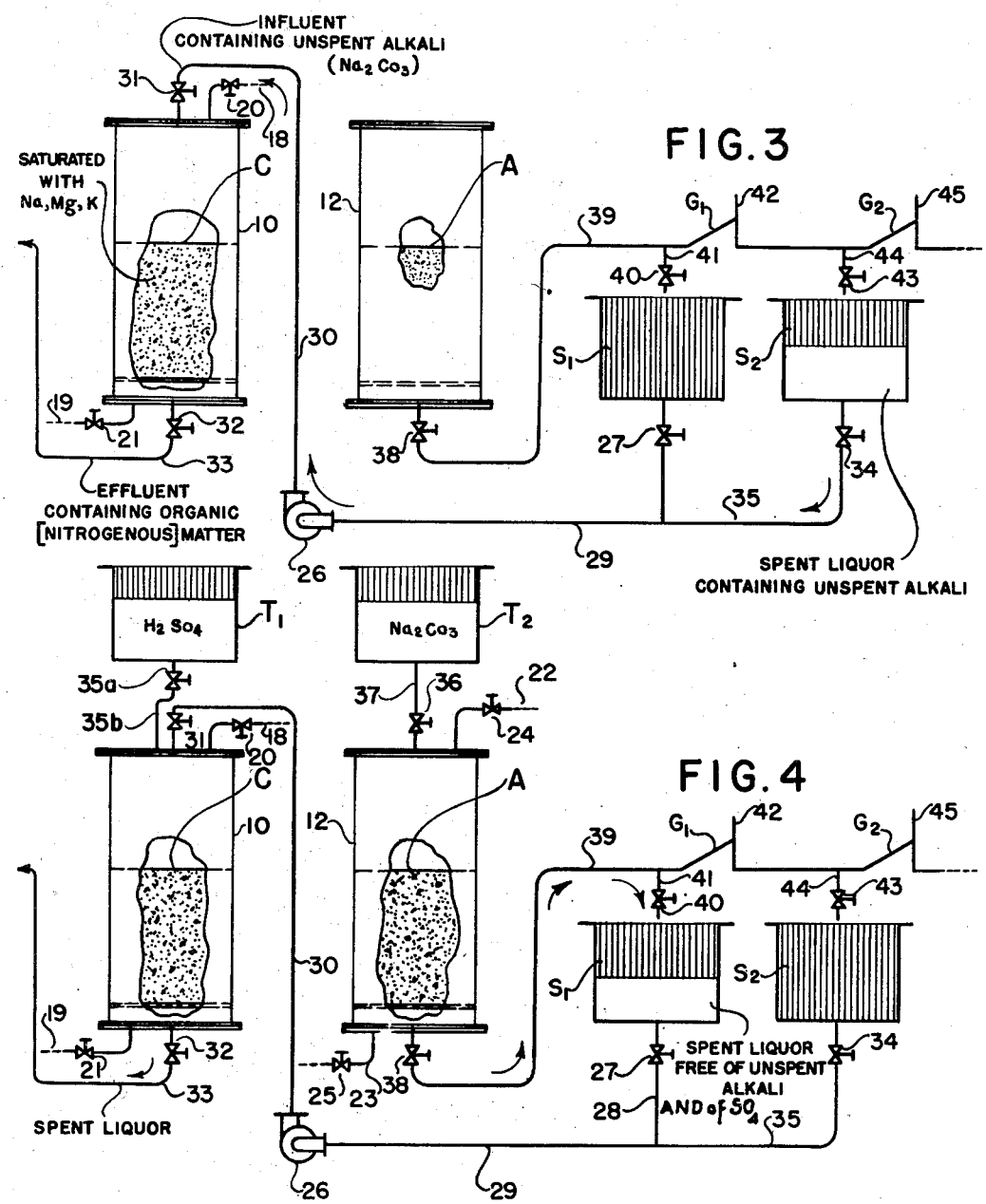

Sept. 27, 1949.  E. A. HAAGENSEN  2,482,765
SUGAR SOLUTION ION EXCHANGE
Filed July 10, 1946  3 Sheets-Sheet 3

INVENTOR:
EDWARD A. HAAGENSEN
BY
ATT'Y.

Patented Sept. 27, 1949

2,482,765

UNITED STATES PATENT OFFICE 2,482,765

SUGAR SOLUTION ION EXCHANGE

Edward A. Haagensen, Westport, Conn., assignor to The Dorr Company, New York, N. Y., a corporation of Delaware Application July 10, 1946, Serial No. 682,462

3 Claims. (Cl. 127—46)

This invention relates to the ion exchange purification treatment of sugar-bearing solutions or sugar juices whereby non-sugar solutes or ionized salts can be removed or abstracted from the sugar solution. More specifically it relates to the regeneration of the bed of granular cation exchange material and of the bed of granular anion exchange material through which the juice is sequentially passed.

It is among the objects of this invention to provide a method of regeneration which is highly effective as to the removal of adsorbed impurities from the exchanger material as well as efficient and economical in regard to regenerant chemicals needed.

The cation exchange bed operates in the so-called H-ion cycle, in that it is conditioned or regenerated with a strong-acid, for example $H_2SO_4$, of suitable strength, thereby becoming saturated with H-ions then exhausted by passage therethrough of the sugar juice which flows from the bed in an acid condition since that bed releases into the juice H-ions in exchange for the cations of the dissolved salts or impurities in the juice, which it adsorbs.

Certain organic dissolved impurities or solutes, not necessarily ionized, for example nitrogenous matter, are also adsorbed from the juice by the cation exchange bed.

The acidified but cation-freed juice then passes through the anion exchange bed which operates in the so-called OH— or hydroxyl cycle since it has been regenerated with a strong-alkali, for example $Na_2CO_3$, of suitable concentration, thereby becoming saturated with OH-ions. The juice passing through this bed becomes de-acidified as the anions of the acid are exchanged for the OH-ions yielded by the bed, with the result that the acid is replaced by the molar equivalent in pure water (HOH or $H_2O$). According to another concept the acid molecule as a whole is adsorbed by the alkali-regenerated bed. At any rate, since the net result is acid removal or de-acidification or neutralization of the juice, the anion exchange is also termed acid removal stage.

The consumption of regenerant chemical is an important economical factor in such exchange operation.

Another problem in the regeneration phase in such operations is that organic matter adsorbed by the cation exchange bed is not always completely removed or sloughed off by the acid regenerant solution. The organic matter can be more effectively removed from the cation exchange bed by auxiliary treatment or wash with strong-alkali solution prior to the final regeneration with the acid.

Still another difficulty occurs with respect to the regeneration phase where the solution or juice has an appreciable amount of Ca-ions adsorbed by the cation exchange bed since $H_2SO_4$ of the regenerant may react with the Ca to precipitate calcium sulfate as an inhibitor upon the exchange material. In such instances the exhausted cation exchange bed can be treated or washed with an auxiliary Na-containing solution of suitable strength in order to replace the Ca-ions with Na-ions.

Consequently, this invention may be said to resolve itself into the following two propositions:

(a) the removal of the organic or nitrogenous matter retained by the cation exchange bed in the treatment of sugar juices, through an auxiliary treatment of the bed;

(b) the substitution of Na-ions for the Ca-ions retained by the cation exchange bed in the deionization treatment of Ca-containing solutions where $H_2SO_4$ is the regenerant acid.

Since an excess of chemical over and above the theoretical quantity is required for the regeneration of an exchange bed, the spent regenerant liquor, especially the trailing effluent portion thereof, contains unspent regenerant chemical which is usually lost although methods and systems have been devised for minimizing the content of residual unspent chemical in the effluent liquor.

According to this invention I attain the above mentioned objects by utilizing the spent regenerant or effluent liquor from the anion exchange bed in applying them in the auxiliary or preliminary regeneration treatment of the cation exchange bed. For example, when the cation exchange bed has been exhausted by beet or cane sugar juice having passed therethrough leaving the bed saturated with cations significantly including Ca-ions, and after residual sugar juice has been washed from the bed (sweetened off), spent anion regenerant liquor is passed to the cation bed.

That is to say I utilize the sodium salt content of the spent portion of the liquor for replacing the Ca-ions in the cation exchange bed with Na-ions, whereas I utilize the alkali of the unspent portion for removing or sloughing off the organic or nitrogenous matter retained by the bed. To this end I intercept corresponding fractions of the effluent regenerant liquor from the anion exchange bed, namely a first fraction containing substantially spent or "converted" liquor, and a second fraction containing besides spent liquor a quantity of unspent alkali.

Passing the first spent liquor fraction through the exhausted cation exchange bed will replace the Ca-ions in the bed with Na-ions. Thus, when the second liquor fraction is subsequently passed through the bed, the unspent strong-alkali therein will slough off the organic or nitrogenous matter, and thus leave the cation exchange bed conditioned for final regeneration with the $H_2SO_4$. Thus the regenerative potency of the acid will be spent exclusively and effectively upon replacing the cations in the beds with H-ions uninhibited by the presence of organics or by the presence of Ca-ions.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation together with additional objects and advantages thereof, will best be understood from the following description of a specific embodiment when read in connection with the accompanying drawings in which The flow diagrams of Figs. 1 to 5 illustrate an example of the improved ion exchange operating cycle according to this invention as exemplified by the purification treatment of sugar juice, although certain intermediate rinsing and washing steps have been omitted for reasons of simplicity. Fig. 1 shows the saturation or exhaustion phase of the juice flowing sequentially through the cation and anion exchange bed.

Figs. 2 and 3 show the auxiliary regeneration of the cation exchange bed, Fig. 2 representing the initial phase (displacement of Ca-ions by Na-ions), and Fig. 3 representing the final phase (displacement of the organics from the bed).

Figs. 4 and 5 show the acid regeneration of the cation exchange bed as well as the alkali regeneration of the anion exchange bed; Fig. 4 indicating the interception of a first portion of the regenerant effluent liquor (substantially completely spent) and Fig. 5 indicating the interception of a second portion of the regenerant effluent liquor (partially spent) from the anion exchange bed.

Figure 1:
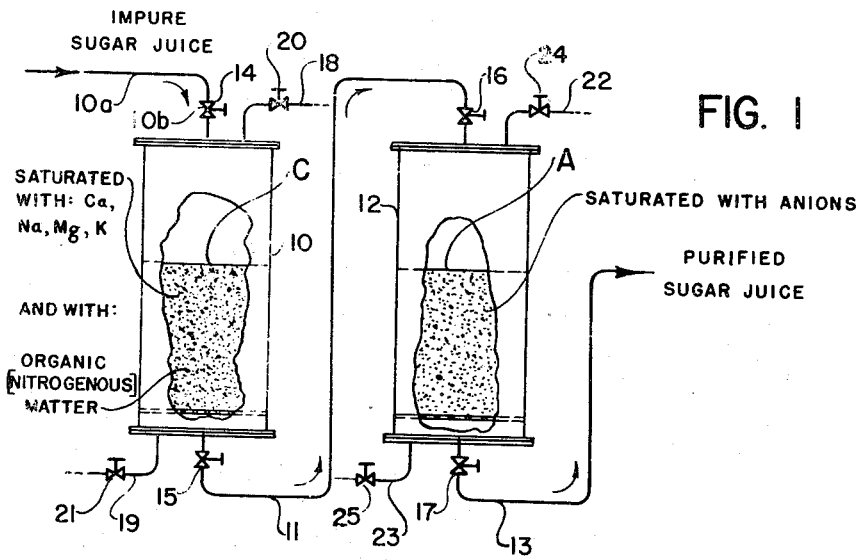

The concept of purifying sugar-bearing liquids or juices by way of ion exchange treatment is not new and it was disclosed in the co-pending patent application of Franklin N. Rawlings, Ser. No. 376,717, filed January 31, 1941 now Patent No. 2,413,844, which describes the purification treatment of clarified beet sugar juice containing non-sugars which comprise (1) inorganic impurities which are strongly ionizable, (2) dissolved organic impurities of complex molecular structure which are non-ionizable or only weakly so, (3) color-imparting impurities, and (4) colloids.

Further teachings as to the operation of ion exchange cycles in purification treatment of sugar-bearing solutions or sugar juices, especially with respect to the selective adsorption by the exchange material of various kinds of impurities, are contained in the abandoned patent application of Franklin N. Rawlings, Ser. No. 479,093, filed March 13, 1943.

Accordingly it is possible to attain a high degree of purification of the juice by the use of certain ion exchange materials which are non-disintegrating in a strong-acid environment. These materials have been described as of the synthetic resinous kind, also known as organolites because their organic nature distinguishes them basically from ion exchange materials which are inorganic, for example the so-called zeolites which disintegrate in an acid environment. By the use of the organolites and by properly carrying out and controlling the exchange treatment process, it is possible not only to rid the juice substantially totally of the dissolved strongly ionized matter or salts or ash substance, but also to remove a large portion of the dissolved organic impurities which are weakly or not at all ionizable, and even to remove color-imparting impurities as well as colloids, all of which result in obtaining a highly pure and highly decolorized juice.

The treatment with the cation exchange material renders the juice acid while subsequent treatment with the anion exchange material restores it substantially to neutral as the molar equivalent of pure water is substituted for the dissolved inorganic matter as the net result of exchange operation.

The high degree of purification of the juice is obtained by allowing an exceptionally low pH to develop in the juice temporarily and because of the H-ion releasing function of the cation exchange material, the degree to which the pH is lowered depending upon the quantity of exchangeable inorganic cation present in the juice. As the inorganic cations from the juice are exchanged for H-ions from exchange material, and under beet juice treating conditions the pH value thus attained may be placed at substantially below 3.0 and more specifically at from 2.0 to 1.5 or less.

In conjunction with this lowering of the pH it has been proposed to cool the hot clarified juice prior to its passage into and through the cation exchange bed to a temperature (ranging from about 20° to 30° C.) sufficiently low to discourage inversion of the sucrose in the juice. By such cooling along with reducing to a minimum the detention time of the juice in its acid phase, any appreciable inversion can be avoided.

Generally speaking, the ion exchange operating cycle comprises (1) the saturation phase, that is the period during which juice is run through a bed of granular ion exchange material until the material has become substantially saturated with exchange ions from the juice, and its exchange capacity has thus become exhausted, and (2) the regeneration phase during which the flow of juice through the bed is interrupted, and suitable regenerant solution is sent through the bed whereby the exchange process is reverted as the exchange material takes on fresh ions of the kind originally contained in it, while releasing the impurity ions which it has taken on from the juice, so that there results a spent regenerant liquor flowing from the bed containing impurity ions originally contained in the juice.

In a practical case of purifying sugar juice the treatment is suitably conducted by including the following sequence of more specific treatment steps: (a) passing the juice downwardly through an ion exchange bed until the bed has become exhausted; (b) removing residual juice from the bed by downwardly displacing it therefrom with wash water; (c) washing the bed free of solid phase impurity matter by passing through the bed an upward flow of wash water whereby the exchange material is loosened up and the bed expanded into teeter condition of the granules; (d) passing regenerant solution through the bed until the bed has become sufficiently regenerated incident to the conversion of the regenerant solution into spent or partially spent effluent regenerant liquor; and (e) displacing residual regenerant solution from the bed with wash water; all of the steps (a) to (e) of this operating cycle being performed with the bed of exchange material being maintained in submergence.

For effectively washing the bed to remove solid phase matter, an upflow of wash water through the bed is provided under such conditions that the granules of exchange material are thrown into suspension or quasi-suspension known as teeter condition whereby the various sizes of the material arrange themselves in strata or zones with the largest at the bottom and the smallest at the top. This effect is attainable by applying a flow of liquid of sufficient intensity or velocity as well as of sufficient uniformity across the entire flow cross-section of the bed.

It has been observed in the treatment of sugar juice that the ion exchange material not only takes up inorganic ions by way of exchange, but also adsorbs organic dissolved, even if not ionized, impurities. Thus it has been observed that nitrogenous matter in the juice is adsorbed by the cation exchange (synthetic resinous H-ion exchange) material. The exchange material exhibits what may be called preferential characteristics for respective kinds of impurities. Thus the cation exchange material appears to have a preference for the inorganic ions over the organic matter, hence an exhausted cation exchange bed presents roughly an influent zone containing cations and an effluent zone containing organic and/or nitrogenous matter, the latter notably including betaine where beet juice is concerned. Again, within the influent zone preferences may be distinguished with respect to the various kinds of cations (such as Ca, Mg, Na, K) representing corresponding zones in the bed.

Conversely, when regenerating a thus exhausted bed it will usually yield the respective impurities in the sequence of their respective affinities relative to the exchange material of the bed. In other words, those of lowest affinity are released first, while those of greatest affinity are released last.

However, the organics in the cation exchange bed exhibit a reluctance to being completely displaced by the acid regenerant solution, whereas they will yield to auxiliary treatment with an alkali.

Juice passing through and from the cation exchange bed has its impurity content of positive or cations substantially removed and replaced by a molar equivalent of hydrogen ions, but it still contains sulphates, chlorides and other negative ionic impurities. Then, in passing through the anion exchange bed the negatively charged ions of the dissolved salts of the juice or anions of the acid formed in the juice are exchanged for the hydroxyl ions of the bed until that bed becomes saturated with sulphates, chlorides and the like anions. Thereupon the saturated anion exchange bed must be regenerated by contact with some suitable alkaline solution such as the hydroxide or carbonate of an alkaline metal or radicle whose compounds have solubilities similar to those of the alkaline metals. Examples of suitable alkaline regenerant chemicals are NaOH, Na$_2$CO$_3$, NH$_4$OH. During regeneration the reverse equilibrium process takes place, namely the residual chloride and sulphate anions in the bed exchange with hydroxyl ions of the alkaline regenerant solution so that the collected negative ions or anions flow from the bed until the bed is substantially re-charged with hydroxyl ions.

The exhaustion or saturation of a bed of fresh, i. e. regenerated exchange material with the solution flowing downwardly therethrough proceeds in continuous fashion from the top to the bottom of the bed. Consequently, there may be visualized, approximately speaking, a dividing line or zone of transition between an upper exhausted or saturated portion, and a lower non-exhausted or non-saturated portion of the bed. This transition zone keeps shifting downwardly through the bed as the continuously through-flowing solution leaves an increasing exhausted portion of the bed behind as it advances through a correspondingly decreasing portion of non-exhausted or still active material of the bed. Since the dividing line is not a sharp one, there will occur a drop in ion exchange intensity as the "break-through" point of the bed is being approached. This is an indication that the bed is nearing exhaustion and should be regenerated or that a freshly regenerated bed should be substituted.

The regeneration of an exhausted bed by a regenerant solution passing therethrough progresses in a correspondingly similar manner through the bed.

An organic cation exchange material suited for the present purpose is of the resinous type such as is exemplified in the United States patent to Holmes No. 2,191,853 describing a synthetic resin of the polyhydric phenal formaldehyde type which is sulphited to a degree such that its sulphur content is not less than 2.4%.

An organic anion exchange material suited for the present purpose is also of the resinous type and is exemplified in the United States patent to Adams and Holmes No. 2,151,883 describing the exchange material as an insoluble resin-like product obtained by the reaction of formaldehyde with an aromatic amine. Ion exchange materials contemplated for use with the present invention are substantially stable in the presence of acids as well as alkalies.

As to their chemical mechanism, the exchange operating cycles, that is the H-ion exchange cycle of the cation exchange bed and the OH-ion exchange cycle of the anion exchange bed, can be described as follows, taking the removal of potassium chloride as an example:

The organic resinous cation exchanger or organolite is assumed to have taken up H-ion in the course of its previous regeneration. Upon contacting the juice with the exchanger, the latter will exchange its H-ion for the potassium cation of the salt and for hydrochloric acid (HCl) according to the following equilibrium: Let X represent the organic structure of frame work of the cation exchanger. Then:

(A) 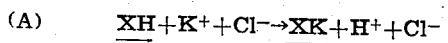

The juice according to Equation A is being acidified because of its reaction with the cation exchanger, since from the cation treatment it will have all or part of its anions converted to their corresponding acid, and so the chlorides, for instance, will have been converted to HCl.

After all or substantially all of the exchangeable H-ions have been replaced with potassium or other cations, for instance, Na, Ca, Mg, Fe, Al, as the case may be, from the juice, the exhausted exchanger is contacted with an acid solution of sufficient acidity, such as HCl, in which case the equilibrium condition is reversed as follows:

(B) $\underline{XK} + H^+ + Cl^- \rightarrow \underline{XH} + K^+ + Cl^-$

This represents that the exchanger is again ready for contacting with juice, while the potassium compound is available in the spent regeneration liquor and thus recoverable. Other acids, such as $H_2SO_4$, $HNO_3$, may be used instead of HCl for regeneration of the cation exchanger with corresponding results.

By contact of the juice with the organic resinous anion exchanger or organolite containing replaceable hydroxyl groups, the anion of the acid (HCl) present in the juice according to Equation A is taken up by the exchanger in exchange for the OH-group, and the following equilibrium established: Let Y represent the organic structure or framework of the anion exchanger. Then:

(C) $\underline{YOH} + H^+ + Cl^- \rightarrow \underline{YCl} + HOH$

According to Equation C the juice is being deacidified as it is being freed from the acid that had previously formed in the cation exchanger according to Equation A.

In this way the cation as well as the anion of the salt constituting the impurity are removed from the juice and replaced with a molar equivalent of water.

When all the exchangeable hydroxyl (OH) groups have been replaced with Cl or other anions from the juice, for instance $SO_4^=$, $SO_3^=$, $NO_3^-$, aconitate ion, the exhausted exchanger is contacted with a suitable alkaline hydroxide or carbonate solution of sufficient alkalinity, such as NaOH, $Na_2CO_3$, KOH, $K_2CO_3$, $NH_4OH$, to reverse the equilibrium as follows:

(D) $\underline{YCl} + Na^+ + OH^- \rightarrow \underline{YOH} - Na^+ + Cl^-$

In the course of a complete operating cycle each of these exchangers, if exhausted, is to have the residual juice therein displaced from the exchanger bed with wash water, and if deposits have collected on the exchanger granules they are to be washed out, before the exchanger is subjected to contact with the regenerant solution. Again, if regeneration is completed, the residual regenerant is to be displaced and washed out from the exchanger with water, before the exchanger is again contacted with the juice.

According to this invention, the cyclic operation of the exchange beds treating sugar-bearing solutions is improved and supplemented by an auxiliary regenerative treatment of the cation exchange bed, whereby (a) Ca-ions collected in the bed and adapted to form a precipitate with $H_2SO_4$ regenerant solution are replaced with ions which will form a soluble reaction product, and/or whereby (b) organic or nitrogenous non-sugars collected in the bed are effectively removed therefrom.

The improved operation according to flow diagrams Figs. 1 to 5 is as follows:

In Fig. 1 a sugar-bearing solution, for example clarified and substantially neutral beet sugar juice, is being passed downwardly through a bed C of cation exchange material contained in a tank 10, which material adsorbs from the juice impurity ions such as Ca, Na, Mg, and K of the inorganic salts dissolved in the juice, as well as organic or nitrogenous matter which is not ionized, whereas the exchange material releases into the juice a corresponding quantity of H-ions which lower the pH of the juice by the formation of a corresponding quantity of acid.

The juice having passed through the bed C and thus having been freed of its cations as well as of said organic matter although acidified, then passes along line 11 to and downwardly through a bed A of anion exchange material contained in a tank 12, which adsorbs the acid from the juice thereby restoring the juice substantially to neutral. Organic impurities, for example aconitic acid, color, and colloids are also retained from the juice by this bed. A purified, that is to say a substantially pure and decolorized sugar solution constitutes the effluent passing out through discharge connection 13 from this bed. Inlet and outlet control valves 14 and 15 respectively are shown to be provided for the cation exchange tank, inlet and outlet control valves 16 and 17 being provided for the anion exchange tank.

The beds C and A in Fig. 1 may be assumed to have reached a desired degree of saturation or exhaustion. Residual sugar solution in the beds may then be displaced therefrom by a downward flow of water through the beds. Valved connection upon the tanks for this purpose are shown to indicate that wash water or rinse water may be passed through the beds of exchange material either upwardly or downwardly. Connections 18 and 19 are provided on the cation exchange tank 10, including control valves 20 and 21 respectively and connections 22 and 23 on the anion exchange tank 12 provided with control valves 24 and 25 respectively.

Following their saturation or exhaustion the beds are then usually cleansed of solid phase matter by an upward flow of wash water therethrough at sufficiently high velocity to expand the bed so that the particles or grains become sufficiently loosened or suspended to permit the solid phase matter to be scrubbed or flushed therefrom. The cleansed bed is then allowed to subside whereupon it is ready for the auxiliary regenerative treatment indicated in Figs. 2 and 3.

Figure 2:
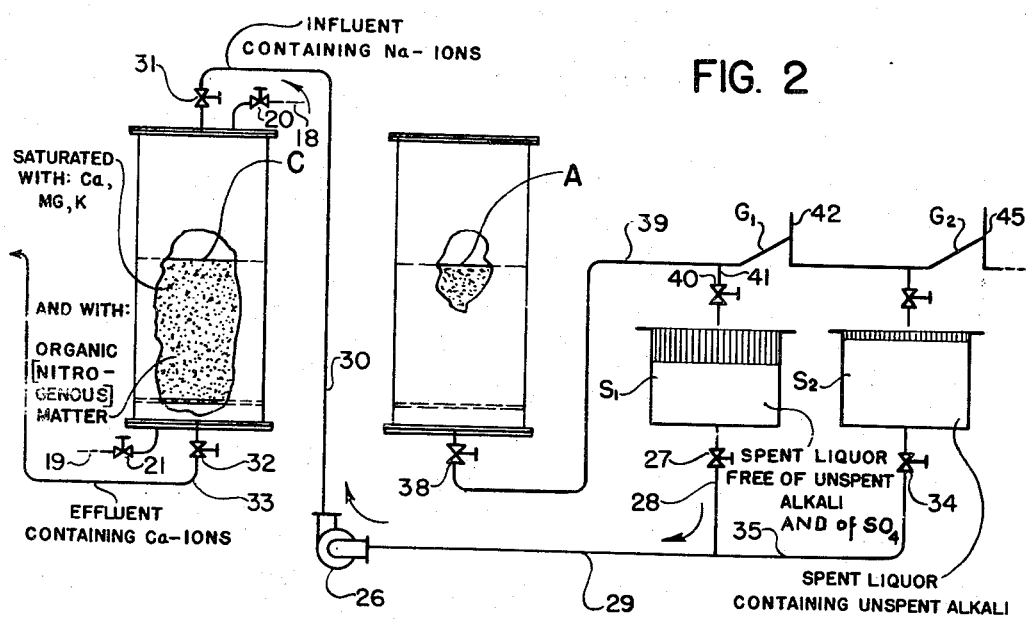

Fig. 2 shows spent solution tanks $S_1$ and $S_2$ containing spent regenerant alkaline solution obtained from a previous anion exchange regeneration. Tank $S_1$ holds a first fraction of spent regenerant liquor containing Na-ions but substantially free from unspent alkali, while tank $S_2$ holds a second fraction of spent liquor containing a quantity of unspent alkali. The contents of these tanks are passed consecutively through the exhausted bed C. In Fig. 2 a pump 26 draws spent liquor from tank $S_1$ through an outlet control valve 27 of a branch discharge conduit 28 leading to a discharge header 29, and forces the solution through a riser 30 and an inlet control valve 31 to the top of bed C. In passing through the bed the Na-ions or $NH_4^+$ ions of the liquor displaced and exchange with Ca-ions collected in the bed, the Ca-ions thus being released by the bed into the solution and being carried off therewith from the bottom of the bed through a control valve 32 of an effluent connection 33, Fig. 2 thus showing the tank $S_1$ partly emptied and the tank $S_2$ still full.

Fig. 3 shows a further advanced stage of this auxiliary regenerative treatment of the cation exchange bed C with tank $S_1$ being empty and the content of tank $S_2$ discharging through an outlet control valve 34 of an outlet connection 35. Since the content of this tank includes a quantity of unspent alkali such as $Na_2CO_3$, it will slough off or displace from the bed the organic or nitrogenous matter which therefore now appears in the effluent passing from the bottom of the bed. In this manner the bed C is left eventually saturated with cations only although substantially free of Ca-ions, and therefore ready to be subjected to uninhibited and efficient regeneration by $H_2SO_4$ contained in supply tank $T_1$, passing through a control valve $35^a$ and supply connection $35^b$ to the cation exchange tank 10, the spent solution passing from the bottom of the bed through the discharge connection 33. The bed A having been washed free of sugar solution and then backwashed by an upward flow of water, is directly ready for regeneration by means of $Na_2CO_3$ solution flowing from a supply tank $T_1$ through an inlet control valve 36 of an inlet connection 37 to the top of bed A. In passing through the bed the OH-ions of the regenerant solution displace the anions (chlorides, sulphates, etc.) from the anion exchange material thus forming Na and other salts or compounds to be carried off by the flow of the spent solution from the bottom of the bed.

Thus according to Fig. 4 an effluent solution which is substantially completely spent but contains a quantity of Na-ions in suitable concentration flows through an outlet control valve 38 of a discharge header 39 and then through an inlet control valve 40 of a branch inlet connection 41 to and into tank $S_1$ being here shown partially filled. When the alkali supply tank $T_2$ is empty it leaves the bed A filled with residual solution which is then displaced by rinse water flowing to the top of the bed from the water connection 22.

Now when the break between the effluent fractions is to be made, the inlet valve 40 of tank $S_1$ is closed, so the bed effluent solution being under some pressure rises through the inclined portion or gooseneck $G_1$ of the header 39 being vented as at 42 and continues to and into the tank $S_2$ through an inlet control valve 43 of a branch inlet connection 44, until tank $S_2$ is also full of a solution containing unspent alkali. If rinse water flow through bed A is further continued while the inlet to tank $S_2$ is closed, the excess effluent under sufficient pressure will find its way through a gooseneck $G_2$ and out of the system, a vent 45 being provided.

Figure 5:
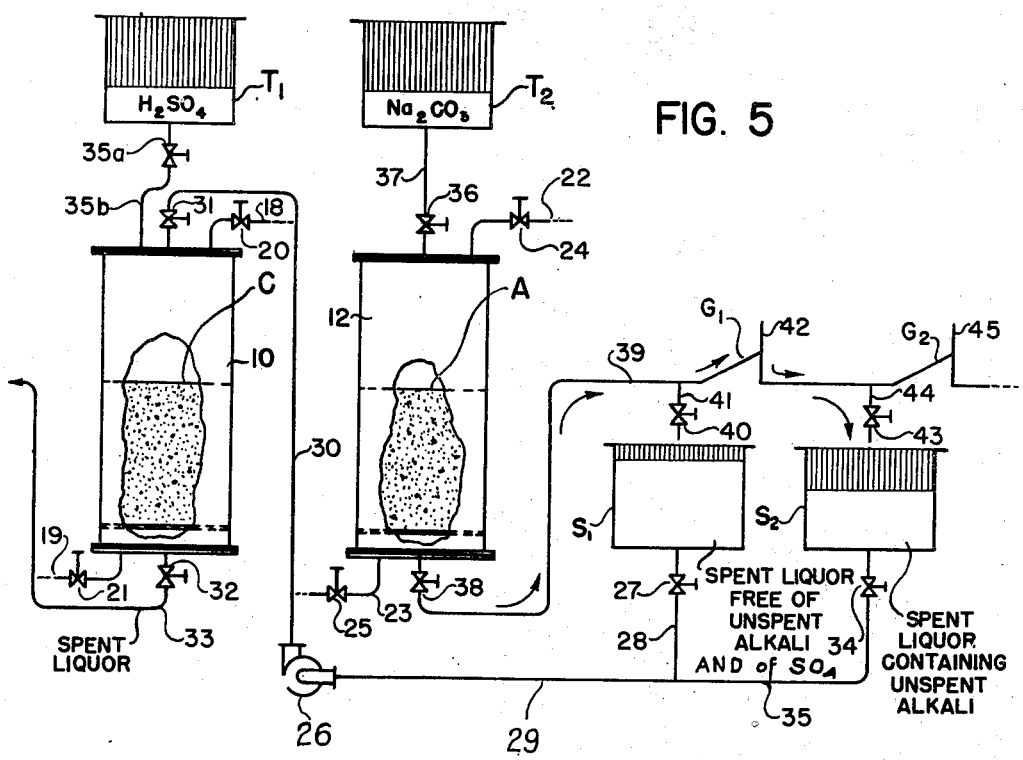

The regeneration of bed C is due to $H_2SO_4$ solution passing from a supply tank $T_2$ through a control valve 45, and according to Figs. 4 and 5 is shown to proceed simultaneously with that of the bed A, as is indicated by the simultaneous lowering of the levels in both supply tanks, namely the $H_2SO_4$ supply tank $T_2$ and the $Na_2CO_3$ supply tank $T_1$.

The manner of fractionation of the spent anion regenerant liquor as by way of the tanks $S_1$ and $S_2$ is furthermore governed by the fact that the anions adsorbed by the anion exchange bed may contain an appreciable proportion of $SO_4$-ions which in due course appear relatively late in the spent effluent regenerant liquor flowing from the anion bed. Therefore the first effluent fraction should also be substantially free from $SO_4$ in order to avoid reaction with the Ca and precipitation of $CaSO_4$ in the exhausted cation exchange bed. The break between the fractions is to be made accordingly by allowing the first fraction to flow into tank $S_1$ only as long as it flows from the cation bed substantially free of $SO_4$.

For example, in cane juice 15–30% of the anions (see table below) are found to be $SO_4$, representing of itself a concentration of $SO_4$ liable to cause precipitation of $CaSO_4$ in the cation exchange bed. However, the $SO_4$ comes off relatively late in the regeneration phase, thus affording an opportunity to segregate a sufficient quantity of $SO_4$-free liquor into the first tank $S_1$ before $SO_4$ comes through in any appreciable amount. The subsequent $SO_4$-bearing fraction of the liquor containing excess regenerant chemical in solution should go into the second tank $S_2$. Consequently the contents of tank $S_1$ are pumped first through the exhausted cation exchange bed to remove as much Ca as possible, whereupon the contents of tank $S_2$ are pumped through to provide the alkalinity (excess regenerant chemical) required to remove the color and other nonionized and organic matter.

Figure 6:
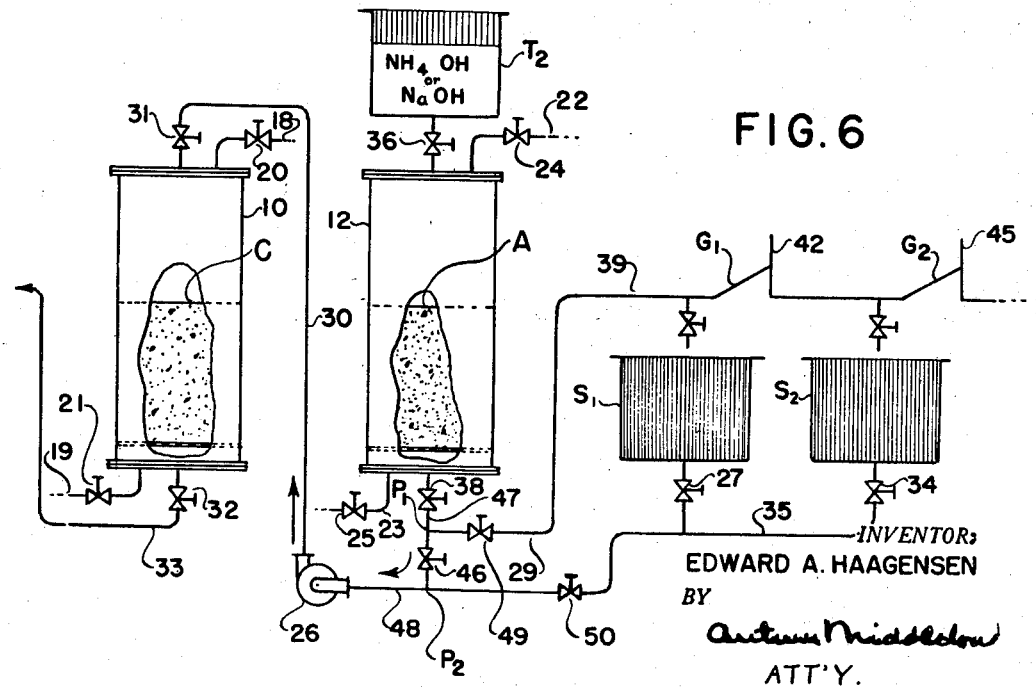
Fig. 6 shows a modification of the manner of regeneration.

With the use of $NH_4OH$ or $NaOH$ especially as the regenerant chemical, the critical constituents in the effluent come off the anion exchange bed in the order in which they are required by the exhausted cation exchange bed. Hence, I also propose to pass the effluent from the anion exchange bed directly through the exhausted cation exchange bed, that is without the intermediary of fractionation tanks $S_1$ and $S_2$. Fig. 6 represents such an alternate procedure.

Therefore, in Fig. 6 an alkali regenerant solution, for example $NH_4OH$ or $NaOH$ is shown to be passing downwardly through the bed A of anion exchange material, passing out at the bottom through valve 38, then through a short length of pipe 47, through a control valve 46, and a pipe connection 48, through pump 26 and riser 30 directly to the top of the tank 10, and through the bed C of cation exchange material, to be discharged at the bottom through control valve 32 and discharge pipe 33. Hence it will be noted that the piping arrangement of Fig. 6 differs from that of the other figures in that the inlet header 39 of tanks $S_1$ and $S_2$ has a control or shut-off valve 49 and leads off a point $P_1$ of the short pipe 47, while the discharge header 29 is provided with a control or shut-off valve 50 and leads into the pipe connection 48 at a point $P_2$ thereof. The valves 49 and 50 are closed rendering the fractionation tanks $S_1$ and $S_2$ inoperative, during the operation of the system according to Fig. 6.

In treating raw sugar beet juice relatively very little Ca will be found present therein. In such case the purpose of using anion effluent regenerant solution will be to remove the organic coloring or taste-forming materials from the exhausted bed of cation exchange material.

Some sugar-bearing liquids contain organic matter which gives undesirable taste characteristics to the juice when it is concentrated to a high Brix after having been subjected to cation and anion exchange. Certain of these organic substances also seem to develop color in the concentrated juice either during the concentration or during storage of the concentrated syrup.

TABLE
*Cane juice ash analyses*

| Constituent | Hawaiian Sugar | | | Argentine Sugar | | |
|---|---|---|---|---|---|---|
| | Per Cent By Wt. | Eq./100 gm. of ash | Per Cent of Tot. Eqs. | Per Cent By Wt. | Eq./100 gm. of ash | Per Cent of Tot. Eqs. |
| Cations: | | | | | | |
| $K_2O$ | 30.2 | .641 | 40.2 | 40.0 | .850 | 55.7 |
| $Na_2O$ | .9 | .029 | 1.8 | 2.0 | .065 | 4.3 |
| $CaO$ | 13.9 | .496 | 31.1 | 8.5 | .304 | 20.0 |
| $MgO$ | 6.1 | .305 | 19.1 | 2.0 | .100 | 6.6 |
| $R_2O_3$ | 2.6 | .124 | 7.8 | 4.3 | .205 | 13.4 |
| Total | | 1.595 | | | 1.524 | |
| Anions: | | | | | | |
| $SO_4$ | 17.1 | .427 | 26.8 | 10.7 | .267 | 16.3 |
| $Cl$ | 16.2 | .456 | 28.6 | 8.1 | .228 | 13.9 |
| $P_2O_5$ | 2.2 | .093 | 5.8 | 1.0 | .042 | 2.6 |
| $CO_2$ | 10.4 | .472 | 29.6 | ¹21.1 | .960 | 58.8 |
| $SiO_2$ | 4.4 | .147 | 9.2 | 4.1 | .137 | 8.4 |
| | 104.0 | 1.595 | | 101.8 | 1.634 | |
| $O\equiv Cl$ | 3.7 | | | 1.8 | | |
| | 100.3 | | | 100.0 | | |

¹ By difference.

I claim:

1. In the process of treating sugar-bearing liquids containing inorganic ionized solutes comprising Ca-ions as well as organic solutes, in which the liquid is passed through a bed of H-ion exchange material whereby the material takes up Ca-ions and other cations of said ionized solutes as well as a quantity of said organic solutes, in which the thus acidified liquid is passed through a bed of acid-adsorbing anion exchange material, in which the cation exchange material is regenerated with $H_2SO_4$ solution and the anion exchange material is regenerated with an alkali solution, the method of regenerating the bed of cation exchange material which comprises collecting from the bed of anion exchange material being regenerated a first fraction of regenerant effluent solution substantially free of unspent alkali, collecting a second following fraction of regenerant effluent containing unspent alkali, and sequentially passing a quantity of said first fraction and a quantity of said second fraction through said bed of cation exchange material whereby said first fraction substitutes alkali regenerant cations for Ca-ions in the bed and the unspent alkali in said second fraction removes organic matter from said bed leaving the bed saturated with cations preparatory to regeneration with $H_2SO_4$.

2. The process according to claim 1, in which the alkaline regenerant solution comprises $NH_4OH$.

3. The process according to claim 1, in which the organic solutes comprise nitrogenous matter.

EDWARD A. HAAGENSEN.

REFERENCES CITED

The following references are of record in the file of this patent:

UNITED STATES PATENTS

| Number | Name | Date |
|---|---|---|
| 2,267,841 | Riley | Dec. 30, 1941 |
| 2,301,669 | Richter | Nov. 10, 1942 |
| 2,366,650 | Rawlings et al. | Jan. 2, 1945 |
| 2,413,784 | Rawlings et al. | Jan. 7, 1947 |

OTHER REFERENCES

Ser. No. 359,575, Smit (A. P. C.), published May 11, 1943.